United States Patent
Knauth

[15] 3,638,485
[45] Feb. 1, 1972

[54] APPARATUS FOR TOTALIZING LIQUID VOLUMES IN A PLURALITY OF CONTAINERS

[72] Inventor: Walter T. Knauth, 1334 W. Grey, Houston, Tex.
[22] Filed: June 5, 1969
[21] Appl. No.: 830,760

[52] U.S. Cl..................................................73/155, 73/311
[51] Int. Cl.........................................................E21b 47/10
[58] Field of Search.....................73/155, 311, 88 BN, 401; 175/38, 48; 33/141 R

[56] References Cited

UNITED STATES PATENTS

| | | |
|---|---|---|
| 3,005,264 | 10/1961 | Shaffer..............................33/141 R |
| 1,720,528 | 7/1929 | Sartakoff............................73/401 X |
| 2,434,837 | 1/1948 | Cornett..................................73/401 |
| 2,659,531 | 11/1953 | Thoresen...................73/388 BN UX |
| 2,669,247 | 2/1954 | Olah..........................73/388 BN UX |
| 3,407,661 | 10/1968 | Knauth..................................73/311 |

Primary Examiner—Jerry W. Myracle
Attorney—Hyer, Eickenroht, Thompson & Turner

[57] ABSTRACT

The apparatus provides a turning moment that is proportional to the total volume of liquid in the liquid containers being monitored. This turning moment controls the pressure in a conduit by controlling the rate gas can bleed from the conduit so the pressure in the conduit is proportional to that total volume of the containers.

23 Claims, 15 Drawing Figures

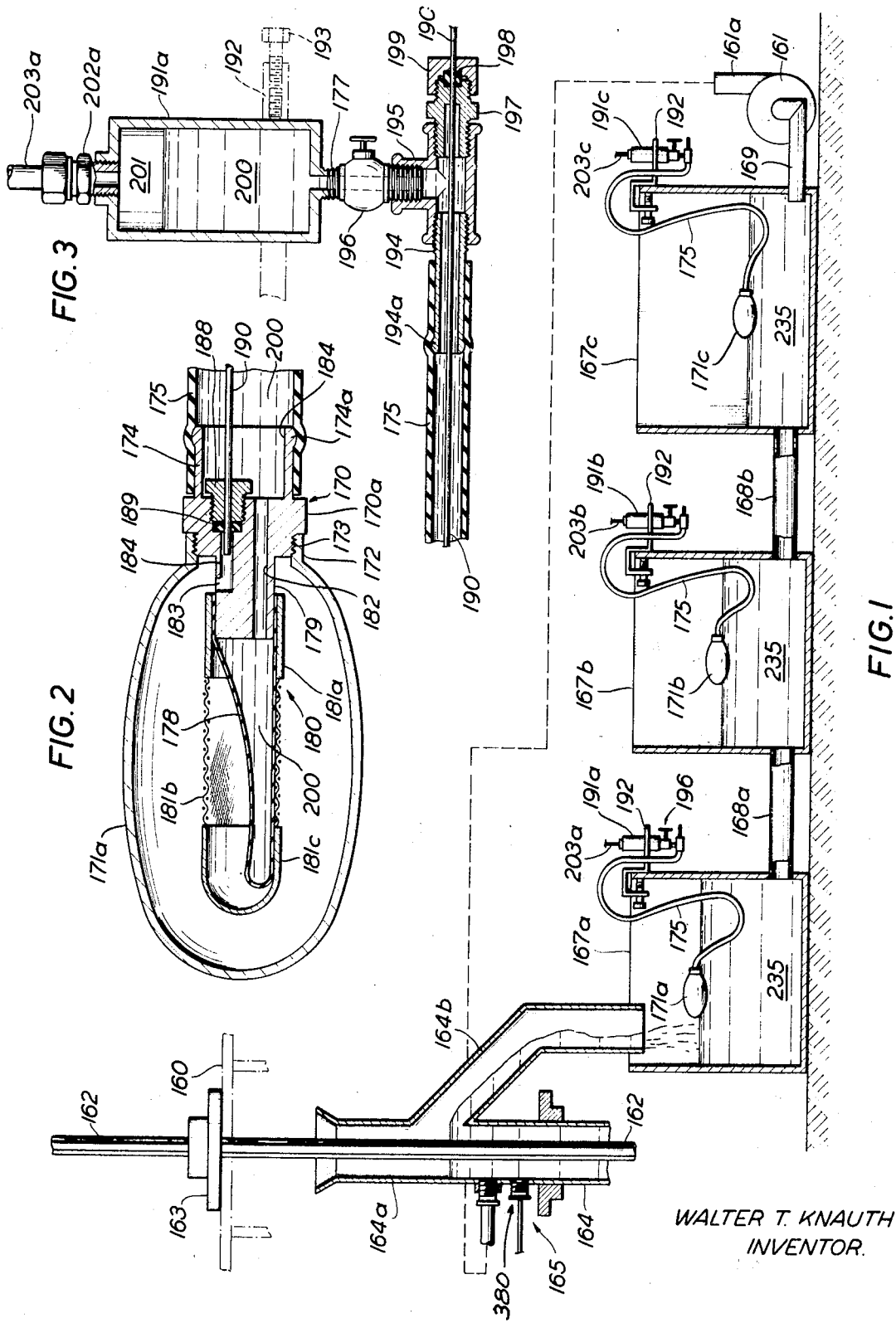

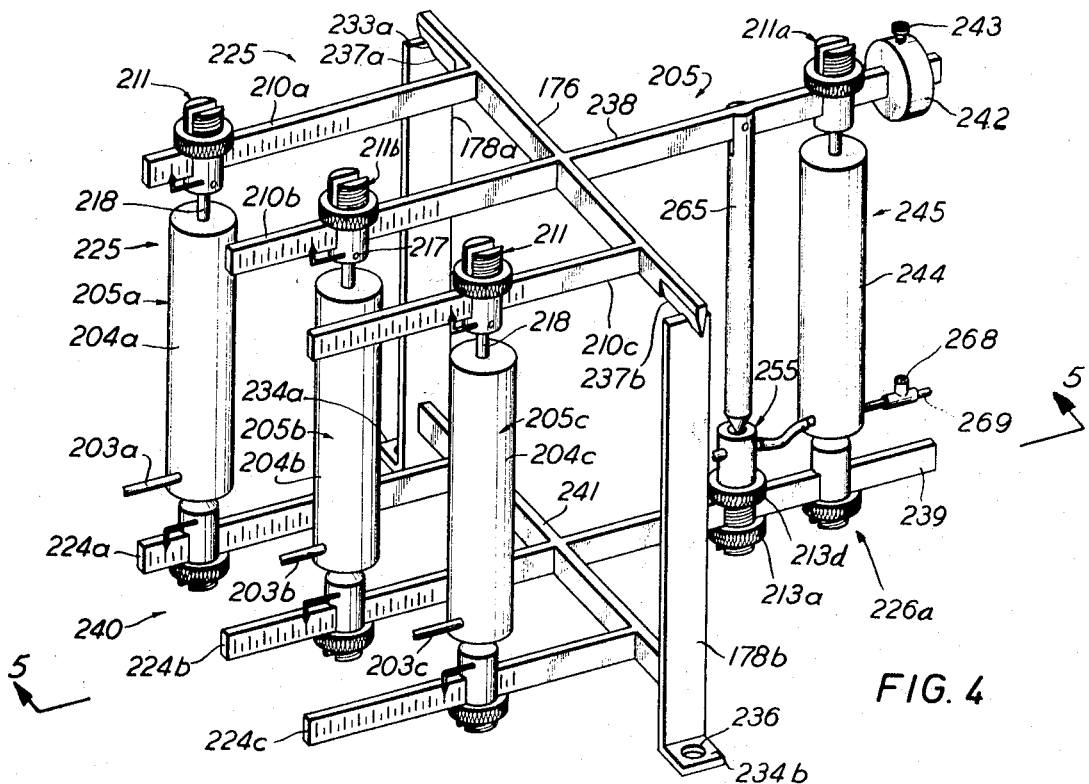
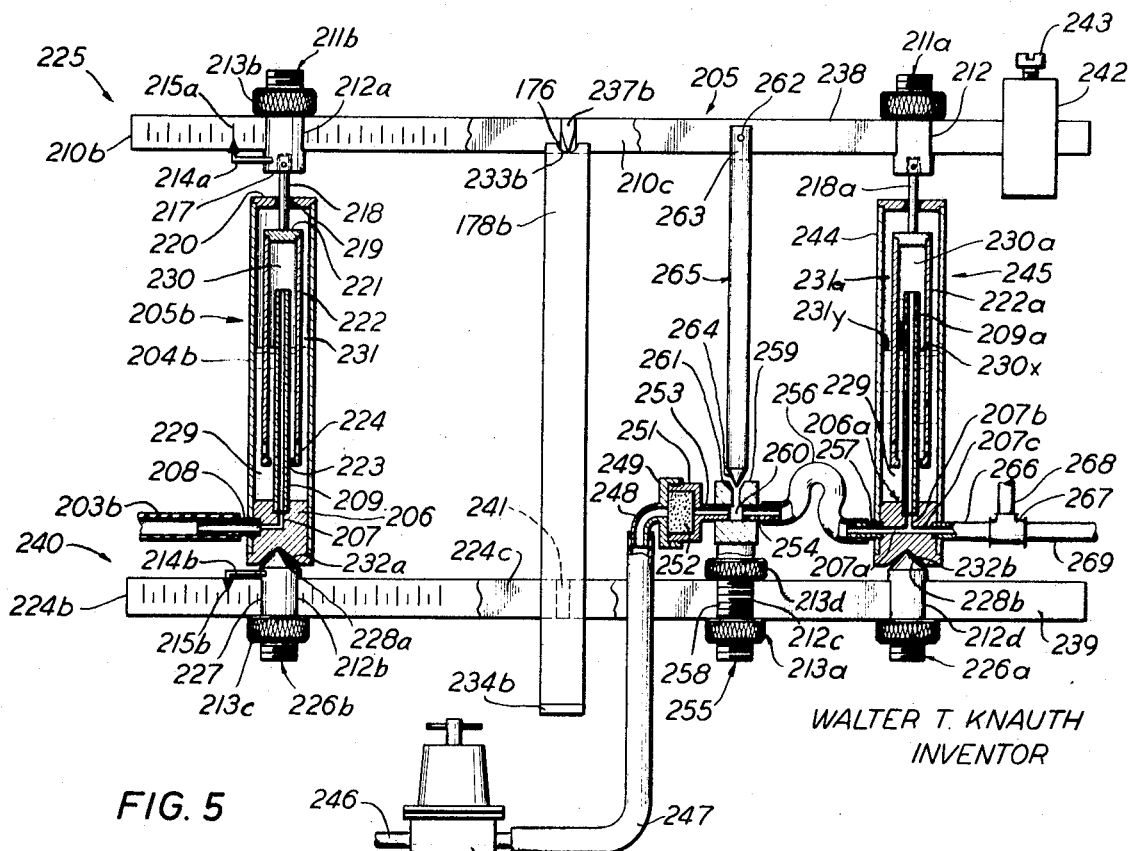

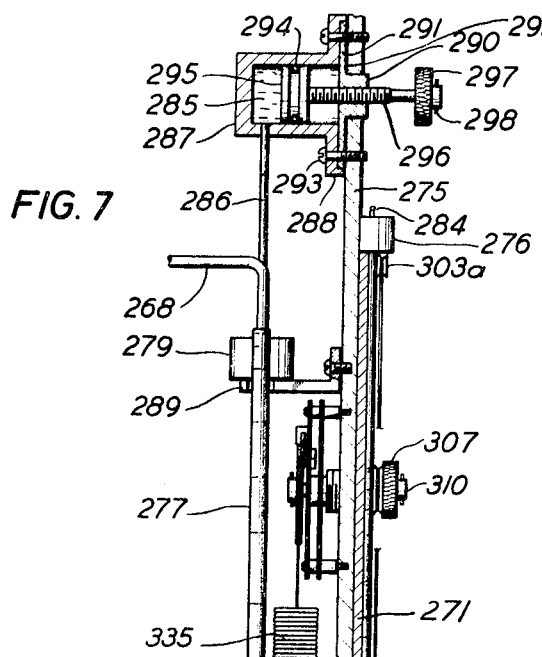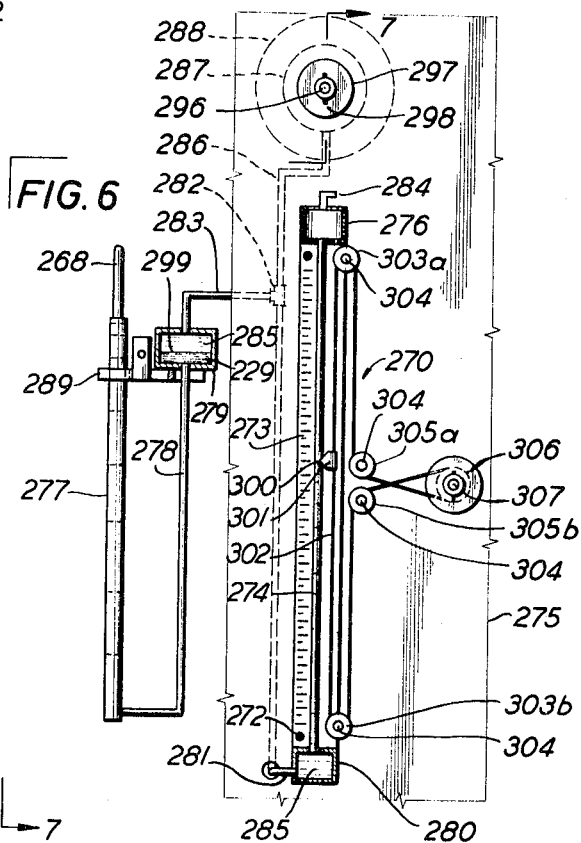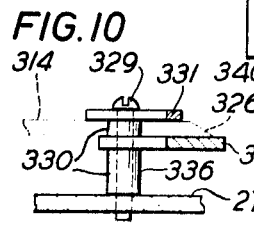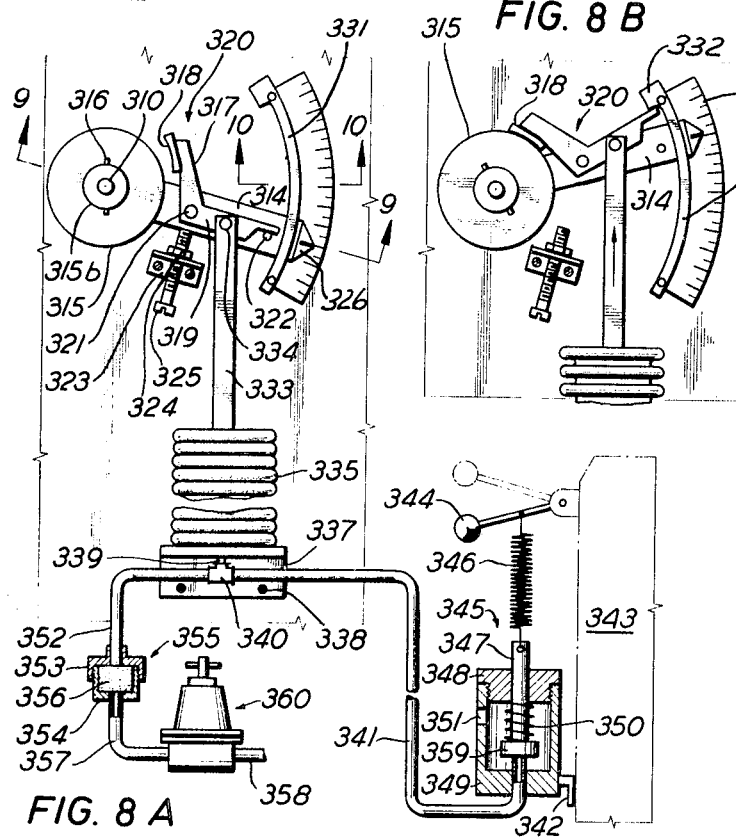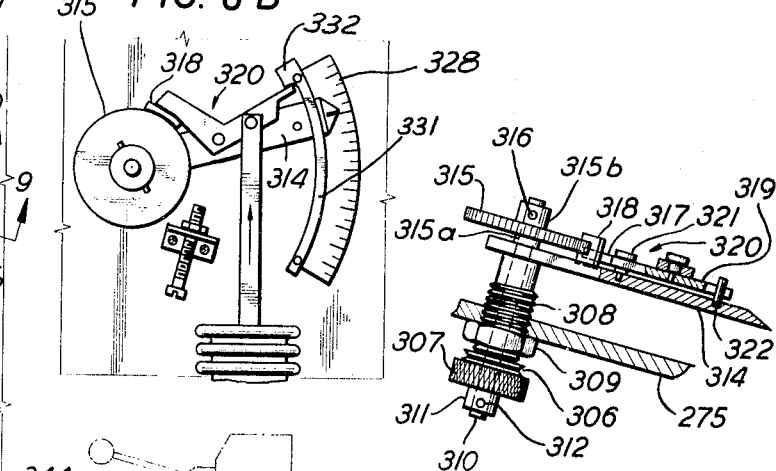

WALTER T. KNAUTH
INVENTOR

APPARATUS FOR TOTALIZING LIQUID VOLUMES IN A PLURALITY OF CONTAINERS

This invention relates generally to apparatus for indicating the total volume of a liquid such as drilling mud, in a plurality of containers. In one of its aspects, the invention relates to apparatus for indicating the amount of liquid that has been removed from the containers as a progressive total. In yet another aspect the invention relates to apparatus for use in drilling operations to indicate the volume of pipe withdrawn from the hole for correlation with the volume of mud pumped into the hole.

This invention has utility wherever it is important to monitor the total volume of liquid in a plurality of containers; however, it has particular utility in connection with oil- and gas-well-drilling operations. When drilling oil and gas wells, one of the greatest hazards is a blowout. These occur when the pressure of the oil and/or gas in the formation exceeds the hydrostatic head of drilling mud in the well bore. Blowouts do not occur instantaneously. First there will be certain signs that will indicate that the conditions in the well bore are such that a blowout would occur if preventive steps were not taken. These preliminary signs are always given. Blowouts that do occur are the result of someone failing to read these signs in time to do something about them.

For example, for a well to blowout, there must be an intrusion of fluid from the formation into the well bore. This means that some fluid in the well bore will have to be displaced. If the total volume of drilling mud at the surface is being monitored closely, a displacement of drilling mud from the hole by the intrusion of fluid from the formation will increase this volume of fluid at the surface and indicate that some fluid other than drilling mud is now present in the well bore. Steps can then be taken to increase the hydrostatic pressure on the formation the amount required to prevent further intrusion.

Most of the people who have studied blowouts, their causes and prevention, agree that the most likely time for a well to blowout and get out of control is while the drill pipe is being removed from the well. One primary reason for this is failure on the part of the drilling crew to replace the steel removed from the hole with drilling mud thereby allowing the level of the mud in the hole to drop which decreases the hydrostatic head on the formation. If it drops below formation pressure, fluid from the formation will flow into the well.

Therefore, there is a need for an accurate easily read apparatus for indicating the total volume of liquid contained in a plurality of containers and it is an object of this invention to provide an improved apparatus for accomplishing this.

It is a further object of this invention to provide apparatus that provides the total volume of liquid in a plurality of containers and which also provides an accumulative total of the volume of liquid removed from the containers.

It is also a further object of the invention to provide apparatus for indicating the total volume of drilling mud in a plurality of containers and that also indicates the total volume of drill pipe pulled from a well bore as it is pulled section by section, whereby the driller knows after pulling each section just how much drilling mud is required to fill the well bore to a reference level.

Furthermore, the instant invention has as an object the provision of a full hole indicator means which continuously indicates whether or not the hole is full up to a reference level.

It is another object of the invention to provide an integrator that combines a plurality of turning moments each of which is proportional to the volume of liquid in a container to provide a resultant turning moment that is proportional to the total volume of all of the containers and converts the resultant turning moment to a fluid pressure that is proportional to the total container liquid volumes that these totalized torques represent.

It is yet another object of this invention to provide an integrator that supplies a fluid pressure signal that is proportional to the total volume of liquid in a plurality of containers and manometer apparatus for indicating changes in the total volume from a selected total volume signal.

Also, it is an additional and important object of the invention to provide a manometer assembly of this class, with surface reservoir volume indicia as a liquid level in a transparent tube, together with positioning adjustment means which permits zeroing of the liquid level indicia along the manometer scale, whereby change of total volume from zero level reference is readily reflected as a subsequent total change in terms of small volume units, such as barrels.

It is another object of the invention to provide pipe displacement totalizer apparatus that is adjustable to a zero position on a common scale with the aforesaid liquid level to indicate the progressive total volume of pipe that has been removed from the well bore, whereby a driller can compare the volume of pipe removed with the volume of drilling mud he has pumped into the well bore to replace the pipe and quickly learn if extraneous fluid is entering the well bore or a formation is taking fluid.

Other objects, advantages, and features of the invention will be apparent from a consideration of this specification including the attached drawings and appended claims.

One preferred embodiment of the invention will now be described as an example of how the invention can be practiced. This embodiment is shown in the attached drawings in which:

FIG. 1 is an elevational view, part in section and partially diagrammatic, showing a drilling mud circulatory system, as used in the rotary method of drilling wells, including containers or tanks of drilling mud;

FIG. 2 is a sectional elevational view through a float typical of the floats shown in the drilling mud tanks in FIG. 1;

FIG. 3 is a sectional elevational view through a reservoir, one of which is connected with each of the floats shown in FIG. 1;

FIG. 4 is an isometric view of the preferred embodiment of the integrator of this invention;

FIG. 5 is a view, part in elevation and part in section taken along line 5—5 of FIG. 4;

FIG. 6 is a side view, with certain parts shown in section of a dual liquid manometer;

FIG. 7 is a view taken along line 7—7 of FIG. 6;

FIG. 8A is an elevational view of a ratchet assembly of the pipe displacement totalizer, part in section, including in cross section an air escape valve, as attached to a drilling rig component;

FIG. 8B is an elevational view of the ratchet assembly only of FIG. 8A, in a different position;

FIG. 9 is a sectional view taken along line 9—9 of FIG. 8A;

FIG. 10 is a sectional view taken along line 10—10 of FIG. 8A;

Figure 11:
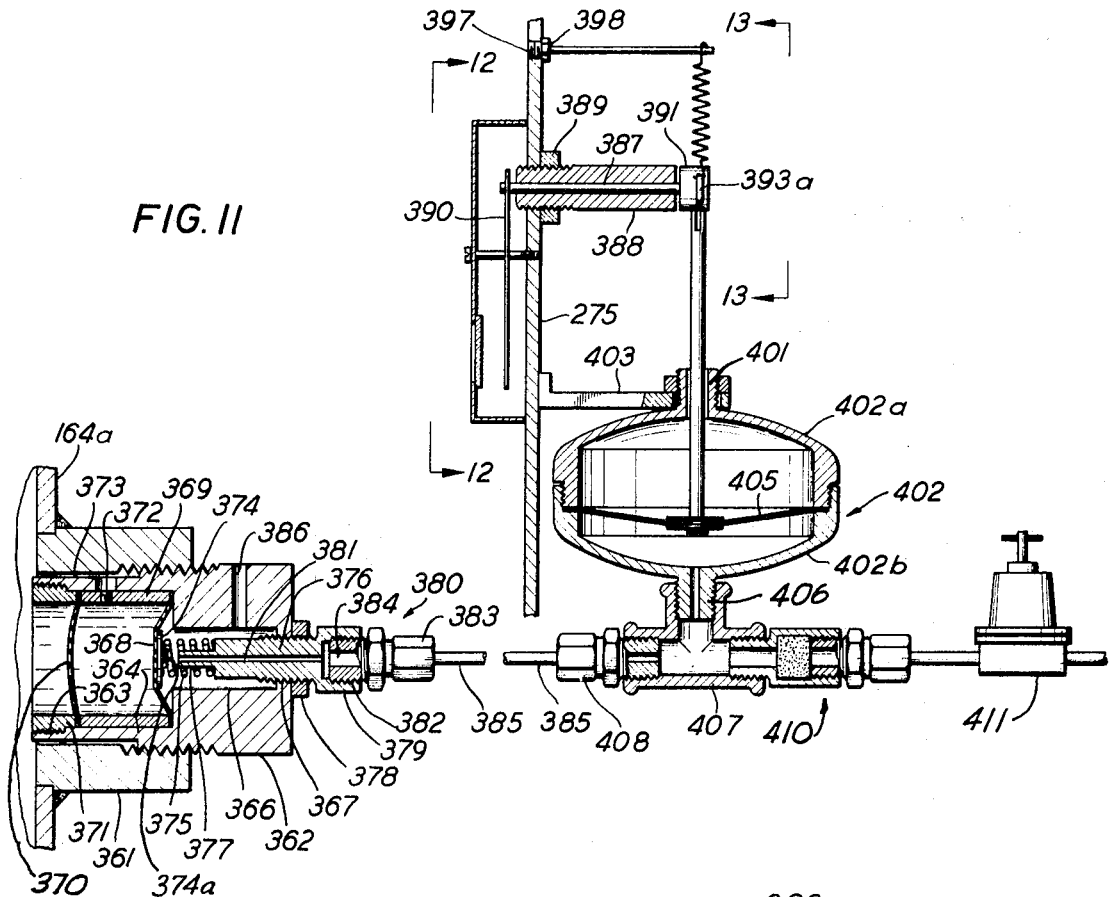
FIG. 11 is a vertical cross-sectional view of an embodiment of the full hole indicator apparatus of this invention.

Floats 171a, 171b, 171c, as shown in FIG. 1, float upon the surface of the liquid in tanks 167a, 167b, and 167c, respectively. The floats are of uniform construction so only the construction of the float 171a, as shown in FIG. 2, will be described. Float 171a has internally threaded neck 172 to receive therein externally threaded hub 173 of adapter 170. Hollow hub 174 on the adapter has raised rim 174a therearound to hold flexible hose or conduit 175 in place on the hub.

Adapter 170 has passage 182. It also has side opening 183 that connects with drill and tapped hole 184 in which is located seal 189 and plug 188. Tube 190 connects the exterior of plug section 179 to atmospheric pressure (FIG. 3), whereas hole 182 connects hose 175 to the interim of sack 178.

Sleeve 180 comprises open ended, cylindrical part 181a, central reinforced wire mesh part 181b, and inner closed end part 181c. Open end part 181a is fitted around the round, open end part of sack 178, which is interposed between adapter inner part 179 and sleeve end part 181a, to extend with closed end within sleeve 180.

As shown in FIG. 1, reservoirs 191a, 191b, 191c, are each supported by C-clamps 192 from the sides of tanks 167a, 167b, and 167c, respectively. Setscrews 193 (FIG. 3) adjustably mount the reservoirs in elevation. Each reservoir 191a, 191b, 191c, is identically constructed, the reservoir shown in detail in FIG. 3 being designated as the reservoir 191a. Nipple 194, T 195, valve 196, and nipple 177 connect reservoir 191a to hose or flexible conduit 175.

Plug 197 is threadably connected into the end of T 195 opposite nipple 194, and the end of small diameter, air communication tube 190 passes centrally through plug 197 and through seal 198, and centrally through stuffing box nut 199, recessed to receive seal 198 therein. Nut 199, being threadably connected upon the outer end of plug 197, thus adjustably compresses seal 198 about tubing 190 to prevent leakage of fluid 200 outwardly from the interior of the tee 195. Fluid 200, preferably a noncorrosive liquid such as diethylene glycol, fills sack 178, float conduit or hose 175 and a portion of reservoir 191a. This leaves space 201 in the reservoir which preferably is filled with a gas such as air. Adapter 202, threaded into the top of reservoir 191a, has flexible tubing 203a connected to the top thereof to connect the top of the reservoir and space 201 to the integrator to be described below.

The reservoir 191a, 191b, and 191c are identically constructed and floats 171a, 171b and 171c are identically constructed. As constructed and connected, and as filled with liquid 200, if the float is raised above the elevation of the reservoir, liquid may flow from sack 178 into the reservoir; the sack collapsing. Conversely, as the float is lowered below the reservoir, liquid 200 will flow from the reservoir into sack 178 and expand it. Preferably, when the float is at the level of the reservoir, the reservoir stands about 75-80 percent full of liquid.

Then, with a closed instrument air system connected above the reservoir, when the float is lowered below the reservoir the pressure of air 201 is reduced. The degree or amount of such reduction is directly proportional to the vertical distance between reservoir level, and the level of the float, which is shown in FIG. 1 is the level of the drilling mud supporting the float.

Thus, each of the tubes 203a, 203b, and 203c, from reservoirs 191a, 191b, 191c, respectively contain a gas pressure that is directly proportional to the liquid level in tanks or containers 167a, 167b, and 167c. In accordance with this invention means are provided for providing a force that is proportional to the level of the liquid in one of a plurality of containers. In the embodiment shown said means includes the float and reservoir apparatus described above and cylinder and piston assemblies 205a, 205b, and 205c of FIGS. 4 and 5. These assemblies are components of integrator assembly 205 which may be disposed at any convenient location remote from the liquid containers. When the apparatus is used on a drilling rig for example, integrator 205 may be located on the drilling rig floor.

All of the cylinder assemblies 205a, 205b, and 205c are of identical construction, so only assembly 205b, shown in section in FIG. 5 will be described in detail. The cylinder has base member 206. Passage 207 in the base connects tube 203b from reservoir 191b to tube 209, which upstands centrally above the base 206, as indicated in FIG. 5, by means of nipple 208.

Graduated bar 210b is supported above the cylinder 204b as will be hereinbelow described. Lug 211b has slot 212a through which bar 210b extends. Lug 211b is threaded externally on its upper portion to have knurled nut 213b threaded thereupon to mount lug 211b to be slid horizontally along bar 210b in adjustment. Pointer 214d is shown extending forwardly from the lower portion of lug 211b to indicate lateral graduation 215d with relation to a vertical plane to be hereinbelow described.

Lug 211b is pivotally connected to piston rod 218 by pin 217. The rod extends downwardly through oversized bore 219 in cap 220 of the cylinder.

The lower end of piston rod 218 is connected to tubular piston 222, which has one end closed by closure cap or plug 221 and one end open. Tube 209 extends upwardly into the bore of piston 222 through opening 223 in the open end. Ports 224 are also provided through the piston wall slightly above its base.

Graduated bar 224b comprising a tine of anchored fork assembly 240, is comparably constructed as graduated bar 210b in the vertical plane thereof thereabove, and a lug 226b is slidably mounted thereon. Lug 226b has slot 227 upwardly thereinto whereby the base of the slot rests upon the top surface of bar 224b; the lower portion of lug 226b being externally threaded to receive knurled nut 213c which bears against the under side of bar 224b. Pointer 214b extends forwardly from the upper portion of the lug to indicate lateral graduation 215b whereby cylinder 204b is mounted with its axis substantially vertical as conical top 228d of the lug extends upwardly into central countersink 232a formed in the bottom portion of base member 206.

A liquid-sealing material 229, such as mercury fills the cylinder to a level well above the open end of piston 222. Liquid 229 seals space 230 from the gas pressure above the liquid in chamber 231, which is usually atmospheric and which acts downwardly on piston 222. Space 230 then is maintained at the same pressure as space 201 in the reservoir associated with it. Therefore, if the pressure in space 230 drops below atmospheric, a differential pressure will exist across piston 222 and it will pull downwardly on arm or tine 210b. Thus with float 171b below reservoir 191b, as in FIG. 1, the pressure in space 230 will be below atmospheric and a downward force on arm 210b is produced. The amount of this force will vary with the variations in the liquid level upon which float 171b floats. An increase in liquid level will increase the pressure in space 230 and decrease the force. Conversely, a drop in liquid level will decrease the pressure in space 230 and the force is increased. Thus, a force is provided that is inversely proportional to the level of a liquid in a container, i.e., the higher the liquid level the less the force and vice versa.

Thus, a force is produced for each liquid container that is proportional to the level of the liquid in the container. Further, in accordance with this invention, means are provided for converting these forces to a turning moment or torque that is proportional to the total volume of liquid in all of the containers.

Thus, as explained above, in the embodiment shown, the rise and fall of the drilling mud level in a respective tank produces a varying downward force on upper graduated bar 210b. Since the bar is mounted for pivotal movement around an axis located to the right of where the force is applied as viewed in FIG. 5, the force exerts a turning moment or torque tending to rotate the bar counterclockwise. The mounting of the bar for such pivotal movement will be described below in detail. Thus, the higher the mud level, the less the downward pull on the bar 210b, and the less the counterclockwise torque or turning moment about its pivotal axis, and the lower the mud level in the tank, the greater the downward pull on the bar 210b, and the greater the counterclockwise torque.

Having carried through the reaction to rise and fall of mud level in the single tank 167b, and its effect on the bar 210b of the integrator 205, the corresponding reaction from the tanks 167a and 167c may be understood, and the structural relationship may be set forth as to the respective bars 210a, 224a, and 210c, 224c with the bars 210b, 224b hereinabove described.

The respective bars 210a, 210b, 210c are laterally spaced apart by a master bar 176 to which the rear or right ends, FIG. 4, of the bars 210a, 210b, 210c are rigidly connected. Uprights 178a, 178b outwardly of the bars 210a, 210c are provided with V-notches 233a, 233b centrally in the upper surfaces thereof, with the uprights 178a, 178b, having feet or bases 234a, 234b extending transversely thereon by means of which they may be mounted by bolts, not shown, passed through boltholes 236 therein, for mounting in a locked box adjacent to the drilling rig floor 160, FIG. 1. The master bar 176 has knife edges 237a, 237b provided on the outer ends thereof to support the upper fork assembly 225 by the disposition of the knife edges in the respective V-notches 233a, 233b. The upper fork assembly 225 is completed by a rearwardly extending bar 238, with forward or left end, (FIG. 4), rigidly connected to the rear face of the master bar or crossbar 176, the bar 238 being coextension of, and in alignment with the central bar 210b and thus corresponding with the handle of a three-tined fork. The entire fork assembly of arms or tines, etc., combine to form a balance arm that is pivotally supported on knife edge bearings.

Lower fork assembly 240 is constructed correspondingly as upper form assembly or balance arm 225 with the exception that master bar or crossbar 241, (to which graduated bars or tines 224a, 224b and 224c are rigidly connected), has its respective ends rigidly connected to the inner side faces of uprights 178a, and 178b. Thus, upper form assembly 225 is pivotally mounted upon uprights 178a and 178b, whereas lower fork assembly 240 is fixedly supported by such uprights. The lower fork assembly includes rearwardly extending bar 239, which is rigidly connected to lower master or crossbar 241, and generally parallel otherwise to upper rear bar 238.

Upper rear bar 238 has counterweight 242 slidably mounted on the rear end portion thereof. The counterweight is releasably held in position on the bar by setscrew 243. Cylinder and piston assembly 245 is mounted between rear bars 238 and 239 by lugs 211a and 226a in the same manner cylinder and piston assembly 205b was mounted between upper and lower tines or arms 210b and 224b. Cylinder assembly 245 is of the same construction as cylinder assemblies 205a, 205b, 205c hereinabove described. Thus, piston rod 218a extends from lug 211a with clearance through the top of cylinder 244 to support piston 222a therewithin with the piston lower portion immersed in mercury 229, as shown in FIG. 5. The lower end of cylinder 244 is closed by baseplug 206a from which upstands tube 209a centrally within piston 222a in correspondence with tube 209 in cylinders 204a, 204b, 204c hereinabove described.

Compressed air is supplied to conventional air pressure regulator 250 through line 246. The regulated air flows through delivery tube 247 to elbow 248. Cap 249 and cup 251 encloses porous ceramic plug 252 through which the air flows from elbow 248. Connector 253 connects cup 251 to horizontal passage 260 through baseplug 255. Connector nipples 254 and 257 and flexible tube 256 connect the other side of passage 260 to baseplug or cylinder base 206a of cylinder 244.

Lower portion 258 of the baseplug has a slot through which bar 239 extends to allow the plug to slide on the bar. Knurled nuts 213a, and 213d on portion 258 hold the plug in the desired position. Upper part or head 259 of the baseplug is bored centrally downwardly and countersunk at 261, whereby the lateral passage through the baseplug communicates upwardly, while the countersink 261 forms a valve seat, to be hereinbelow described.

Upper bar 238 has rod 265 suspended therefrom by means of pivot pin 262 which passes through the bifurcated upper end 263 of the rod and through bar 238. The lower end of rod 265 has conical tip 264, which serves as a valve element. Baseplug 255 is positioned on bar 239 with rod point 265 suspended above countersink 261. By adjusting locknuts 213a and 213d baseplug 255 may be raised or lowered until point 264 of the throttle rod extends comfortably within orifice or escape port 261. Preferably, this places upper fork assembly 225, when balanced on the knife edges, generally horizontal with its bars or tines above and parallel to the corresponding bars of the lower fork assembly, and in position to vary the opening through the orifice as it moves up and down. The valve rod and valve seat then act as a bleed valve that allows air to escape through orifice 261 at varying rates depending on the position of the valve element.

From the connection nipple 257 fluid communication is carried within cylinder base 206a, by means of lateral passages 207a and 207c, which are intersected by vertical passage 207b to communicate with central tube 209a, which corresponds with the tube 209 in the cylinder 204b. Connection nipple 266 extends outwardly from the right-hand passage 207c of the cylinder base and has connected thereto tee 267. In FIG. 5 a tubing 269 is shown extending from the lower, right leg of tee 267. Tubing 269 is connected to a conventional pressure recorder. From the upper leg of tee 267, tubing 268 extends for connection to an especially sensitive, dual liquid density manometer, to be described below.

The structure hereinabove described provides means, whereby downwardly acting forces are developed that are in parallel and inversely proportional to the drilling mud level within tanks 167a, 167b, and 167c. When such a force is applied to a balance arm such as bars 210a, 210b, and 210c of fork assembly 225, pivoted as shown in FIGS. 4 and 5, it develops a counterclockwise torque or turning moment about the knife edges 237a and 237b that support master beam 176. Cylinder and piston assemblies 205a, 205b, and 205c are each independently movable along the two bars between which it is mounted to vary its distance from the axis around which the balance arm pivots. Since the force each cylinder assembly produces is inversely proportional to the level of the liquid in the tank with which it is associated, the turning moment the force produces can be made proportional to the volume in the tank by locating the force an appropriate distance from the axis of the balance arm.

In accordance with this invention, means are provided that are responsive to the total turning moment to provide a fluid under pressure that is proportional to the volume of liquid in the tanks. In the embodiment shown, these means include counterweight 242, cylinder assembly 245, and the bleed valve assembly described above. With this assembly, the total counterclockwise acting torque forwardly of master bar 176 is countered or opposed by the downward forces applied to the aforesaid balance fork handle or bar 238 by counterweight 242. Another force acting on bar 238 is that developed by the compressed air which passes from the regulator, past escape port 261, and via passage 207a in the cylinder base, up passage 207b and tube 209a into space 230a within piston 222a of balance cylinder 244. Thus, the pressure in space 230a will be equal to or above atmospheric, the pressure above the piston. When it is above atmospheric, the cylinder assembly provides a force that acts upwardly on piston rod 218a to urge bar 238 to rotate counterclockwise as viewed in FIG. 5.

At this point it should be pointed out that air pressure regulator 250, which receives compressed air from a source (not shown), supplies a reasonably constant pressure of air to the upstream side of porous ceramic plug or choke 252. The choke is designed to drop the pressure of the air flowing through it more than 50 percent. With such a pressure drop, the volume of air flowing through the chokes remains substantially constant. Thus, there is no appreciable increase in downstream air volume flow even if the downstream back pressure should be reduced to zero, therefore, compressed air regulator 250 is adjusted accordingly to provide air to the choke at no less than about twice the maximum back pressure required for instrument actuation downstream of the choke.

As downstream air passes into the piston space 230a, the manometer and the recorder downstream of the choke 252 and throttle valve 264, 261, each a closed system, the volume of air input going to operate these systems, is inversely proportional to the amount of air that is allowed to escape to the atmosphere through orifice 261 of the throttle or bleed valve. Thus, when orifice 261 is closed by valve element 264 or by clockwise motion of bar 238 about its axis of rotation, the escape of air through the orifice will be substantially restricted. This will cause the pressure of the air downstream of the choke to build up.

Conversely, if bar 238 is tilted in counterclockwise direction about its axis of rotation the opening through orifice 261 will be increased and more air will escape therethrough, whereby the air pressure decreases in balance piston area 230a, and also the air pressure going to operate the manometer and recorder decreases.

When the greatest counterclockwise torque is effective about the master bar 176, all of the tanks 167a, 167b, 167c will be empty. For at that time, the respective spaces 230 within pistons 222 will be under the greatest vacuum. Usually, for empty tanks it is preferred to have the pressure of the air going to the readout instruments at its minimum. Therefore, counterweight 242 is slid along bar 238 until it maintains the upper fork assembly substantially horizontal. This should dispose balance rod 265 in a position where its point 264 is suspended over the escape port 261 so that the maximum volume of air can escape therethrough and consequently a minimum air signal is applied to the conduits 268, 269, which lead to readout instruments such as a manometer assembly and a recorder. Also at this condition of minimum air signal, piston rod 218a of the balance piston 222a, is producing its minimum force in opposition to the torque produced by the counterweight. Thus it may be said that the greatest counterclockwise torque produced by tank volumes results in a minimum air signal reading when the tanks are empty. Conversely, a maximum air signal is produced when the tanks are full. At that time a minimum suction operates in the respective piston spaces 230 at which time the countertorque of the balance weight 242 about the fulcrum 237a, 237b disposes the rod 265 with its valve seat 264 within the countersink 261.

As the pressure of the air varies from its maximum to its minimum, the force output of balance cylinder 245 also varies. Its force output increases as the force output of the individual tank cylinders 205a, etc., decreases and vice versa. The area of the piston and the regulated pressure of the instrument air determines the maximum force the cylinder produces. Both of these variables can be adjusted to provide the desired range of forces.

Figure 14:
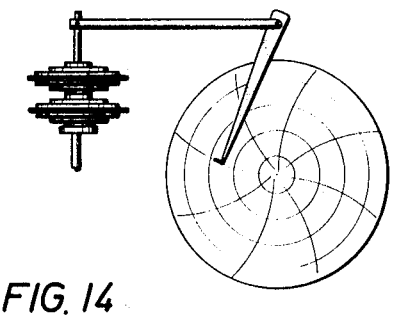
FIG. 14 is a schematic view of portions of a conventional pressure recorder.

The invention, as aforesaid, sets out to convert this countertorque automatically and continuously into a single air pressure signal which is inversely proportional thereto, and therefore directly proportional to the total volume of drilling mud in those tanks. The signal then can be used to provide a continuous recording of the volume and also for indicating small changes in mud volume, as by a liquid level indicator. The continuous recording can be obtained through a conventional chart recorder, such as shown schematically in FIG. 14. The sight reading is obtained in accordance with this invention with a novel dual liquid density manometer, designed so that a small change in air pressure moves the liquid level through a much larger distance than the same change in air pressure would move the pen arm on a recording chart, whereby a change as small as a barrel in capacity may be readily observed.

Referring now to FIGS. 6-10, inclusive, such a dual liquid density manometer assembly 270 is shown as included on instrument panel 275, which preferably is located so it can be easily seen by the driller. Manometer assembly 270 includes a lengthy, vertically disposed, rectangular base 271 mounted on panel 275 by screws 272. Scale 273 is graduated upon base 271 in parallel with glass tube 274 mounted upon the base. The scale may be graduated in terms of say 40 barrels of drilling mud from a zero mark to the upper end of the scale and in terms of say 110 barrels from the zero mark downwardly to the lower end of the scale, the spaces between graduation marks being equivalent to one barrel.

Conduit 268, downstream of the balance cylinder assembly 244, (FIG. 4 and 5), transmits the total volume air signal into the top of uprightly mounted glass tube 277 in opposition to mercury 229 within the tube. The bottom of tube 277 communicates with tube 278 upstanding parallel to glass tube 277 and terminating upwardly in mercury reservoir 279. Bracket 289 supports glass tube 277 and reservoir 279 behind the panel.

The glass tube and tube 278 parallel thereto together comprise the first or heavy density liquid manometer of a dual liquid density manometer assembly 270.

A low-density liquid, such as a lightweight, colored petroleum oil 285 has surface contact above the mercury in reservoir 279 and extends upwardly within tube 283 to T 282 from the upper leg of which tube 286 carries communications to cylinder 287 in which the effective sensing volume of the fluid or oil is adjusted, as will be explained hereinbelow. From the lower leg of T 282, tubing 281 extends downwardly and around to a position for connection into the lower portion of lower reservoir 280 for the lightweight oil, such being disposed on the front face of instrument panel 275.

From reservoir 280 there extends upwardly glass tube 274 supported on the front side of rectangular base 271, the base being mounted on the instrument panel by mounting screws 272. Graduated scale 273 described above is printed upon base 271 parallel to glass tube 274. At the top of the glass tube above the scale, reservoir 276 is supported. The reservoir is vented to the atmosphere by vent 284. This is a reservoir for the upper oil or light liquid and has a capacity to store temporarily the light liquid or oil 285 without overflow, in case the liquid level is driven up beyond the scale. Tubing 281 together with the glass tube 274 thus comprise the second, or light density manometer, of the dual liquid density manometer assembly 270.

For adjustment cylinder 287 is provided with flange 288 having recess 291 therein to receive flange 292 of internally threaded hub 290. Machine screws 293 pass through the cylinder flange and hub flange 292 to mount cylinder 287 and hub 290 upon panel 275. The panel is bored to receive the hub forwardly therethrough. Piston 295 with O-ring 294 therearound, is disposed within the cylinder. Threaded rod 296 extends forwardly through the hub and has its forward end turned down to provide a shoulder for knurled handwheel 297 to be mounted thereon and fixed in position by pin 298 through the wheel hub and piston rod outer end.

If wheel 297 is turned to the right, the piston is moved rearwardly to force the liquid out of the cylinder, thereby forcing fluid level 300 to rise in indicator tube 274. Conversely, if the wheel is turned to the left, the piston is moved forward and the oil-constraining capacity is increased. This drops the oil level in the indicator tube. This allows the level of oil in sight glass 274 to be adjusted to a zero or any other desired level so changes in total volume can be read quickly and easily, as opposed to reading total volume-indicating charts.

In operation of air signal representative of the total mud volume passes from tubing or conduit 268 into the top of glass tube 277 to bear upon the top of the mercury therein. As the pressure of the air increases from zero to maximum, the mercury in tube 277 is driven downwardly, raising the mercury level in reservoir 279. This, in turn, displaces the light oil from the reservoir causing the level in the sight glass to rise. A decrease in air pressure causes it to drop.

In accordance with another aspect of this invention, means are provided for indicating the total volume of pipe that has been removed from the hole at any given time. In the embodiment shown, the pipe displacement totalizer comprises pointer 301, FIG. 6, to which the ends of cord 302 are connected. The cord extends upwardly and downwardly from the pointer and passes over upper and lower V-groove pulleys 303a and 303b, located adjacent the upper and lower ends, respectively, of tube 274. The cord also passes over upper and lower pulleys 305a and 305b, respectively, adjacent the center of tube 274. All of the V-groove pulleys are; disposed on spindles 304 that extend from panel 275. The cord then extends diagonally to the right and after crossing over itself, wraps around V-groove pulley 306 which comprises the inner hub of handwheel 307, FIGS. 7 and 9. Externally threaded bearing assembly 308 is mounted in a tapped hole in panel 275 and locknut 309 is threaded onto the outer end of the bearing to lock the bearing assembly to the panel. Handwheel 307 also has outer hub 311 formed therewith and handwheel 307 and bearing assembly 308 are bored to receive shaft 310 therethrough with tapered pin 312 passing through the outer hub and shaft to lock the wheel and shaft together. In assembly the inner face of pulley 306 thus turns rotatably with the shaft and with relation to the outer face of bearing assembly 308, as will be understood as the assembly is further described. Shaft 310, which extends through bearing 308, extends rearwardly successively through a bore of pointer bar 314, and through ratchet drive wheel 315. The drive wheel has hub 315b, which is connected for rotation with shaft 310 by tapered pin 316. The pin passes through the hub and the shaft.

Shoe lever or pawl 320 (FIGS. 8A and 8B) includes arm 317 which mounts brake shoe 318 to bear, when applied, against the face of ratchet drive wheel 315. The pawl or brakeshoe lever also includes actuating arm 319 which extends to approximately 120° to brakeshoe holder arm 317. Flat headed pin 321 extends through a bore in pawl 320 at or adjacent the junction of arms 317 and 319. The pin is press-fitted into pointer bar 314 inwardly thereof whereby pawl 320 is mounted to pivot with relation to pointer bar 314.

Stop pin 322 extends outwardly from the pointer bar to limit the clockwise rotation of actuating arm 319 relative to pointer bar 314. Stop means are also provided to limit the clockwise rotation of pointer bar 314. Angle bracket 323 is mounted on the rear side of panel 275 at a calculated distance below and to the right of shaft 310. Threaded bolt 325 is located in a tapped hole through the angle bracket with upper end to serve as an adjustable stop for bar 314. It is held in the desired position by locknut 324. The free end of the pointer bar beyond is tapered to point 326 for designating graduations imprinted upon arcuate scale plate 328. Pointer bar 314 is mounted to rotate about shaft 310 between the end of bearing assembly 308 and inner hub 315a of ratchet drive wheel 315. The force-actuating movement of pawl assembly 320 to rotate master or pointer bar 314 therewith is supplied by bellows-actuated bar 333 which is connected to the upper end or head of bellows 335. The upper end of the bellows bar 333 is pivotally connected to actuating arm 319 by pin 334, which extends through a bore in the bellows bar and is press-fitted into a hole in pawl-actuating arm 319 intermediate pin 321 and stop pin 322.

Thus, as the bellows expands or accordions upwardly due to an increase of internal pressure exerted by the fluid therein, the actuating arm and brakeshoe arm 317 are rotated counter-clockwise, as viewed in FIGS. 8A and 8B to move brakeshoe 318 into frictional engagement with ratchet wheel 315. Then further upward movement of the bellows bar rotates pointer bar 314 in counterclockwise direction so that the point 326 moves with relation to the aforesaid arc of graduations 327 printed upon the aforesaid scale plate 328; (see FIG. 10). Pointer arm 314 is held in frictional engagement with scale plate 328 by arcuate holddown plate 331 (FIG. 10) so that the force required to move the pointer arm will be more than that required to hold brakeshoe 318 in firm, nonslip engagement with periphery of ratchet wheel 315. The scale plate and hold down plate are spaced from panel 275 by spacers 330 and 336, located on mounting screws 329, as shown in FIG. 10.

Guide or holddown plate 331 has lug 332 projecting from the end portion thereof that extends into the path of the actuating arm 319 to stop the upper counterclockwise travel of the arm. Conversely, as bellows bar 333 is drawn downwardly by the contraction of the bellows, first actuating arm 319 is drawn downwardly against stop 322, and then pawl assembly 320 and master bar 314 are moved downwardly together, overcoming the frictional drag of the end of the pointer bar between the scale bar and holddown plate. The limit of downward travel of the master bar, (and pawl 320 therewith), is controlled by the position of the upper end of stop bolt or screw 325, as aforesaid.

The lower end or base of bellows 335 is affixed upon the top leg of structural angle 337 having its lower leg affixed to the rear face of panel 275 by capscrews 338. The fluid to the bellows is supplied through connection nipple 339 which extends upwardly through the upper leg of angle 337 to communicate with the interior of the bellows. The lower end of connection nipple 339 is connected into the top leg of tee 340 disposed just below the upper leg of angle 337.

From the right horizontal leg of T 340, conduit 341 extends through the base of escape valve 345, which is mounted by angle 342 to control box 343 which serves to engage and disengage the clutch drive, not shown, of rotary table 163, indicated diagrammatically in FIG. 1 at top of drilling rig floor 160. Tension spring 346 connects throttle lever 344 to the upper end of valve stem 347, which extends downwardly through closure cap 348 to valve element 359. The valve element seats upon the upper end of conduit 341 within escape valve housing 349. Spring 350 around the valve stem 347 bears upwardly against closure cap 348 and downwardly upon valve element 359 to urge the valve seated. Also valve housing 349 has air opening 351 thereinto.

From the left horizontal leg of T 340 a conduit 352 extends to choke assembly 355 comprising internally threaded cap 353 engageable upon externally threaded cup 354 containing porous ceramic element 356. Connecting conduit 357 extends from the choke assembly to compressed air regulator 360, which receives compressed air from source 358.

In operation; pointer 301 is moved a preselected distance each time the rotary table clutch is engaged. This happens as follows. With clutch lever 344 in the position shown solid in FIG. 8A, full regulator pressure is contained in the bellows and pointer arm 314 are at the top of their travel. When the rotary clutch is engaged, valve element 359 is raised from the end of tubing 341, relieving the air pressure in bellows 335. The air flowing through regulator 360 can't maintain the pressure in the bellows so it contracts, pulling pointer arm 314 and the pawl downwardly against stop 325.

When the rotary clutch is disengaged, valve element 359 seats and the pressure builds up again in the bellows. As the bellows expands, actuating arm 319 is pivoted relative to scale arm 314, moving brakeshoe 318 into engagement with ratchet wheel 315. The bellows cannot expand any more unless it moves pointer arm 314. As this occurs, shoe 318 moves the ratchet with it as shown in FIG. 8B.

Also as shown in FIG. 8B, stop 332 releases shoe 318 from the ratchet when by forcing actuating arm 319 to pivot clockwise around pin 321 just before the pointer arm reaches the end of its upward travel.

Rotation of the ratchet wheel moves pointer 301 an incremental distance through cord 302. By adjusting stop 325, the pointer can be made to indicate the volume of pipe removed from a well bore in barrels. Thus, the pointer will give a visual indication of how many barrels of liquid must be pumped into the well bore to replace the pipe that has been pulled and keep the well bore full of liquid. If the liquid level 300 of the manometer should begin to lag behind the pointer it would indicate that fluid may be entering the hole and that possibly the weight of the drilling mud should be increased.

As shown and described, the means for indicating the volume of pipe removed is actuated by the engagement of the rotary table. This is a convenient arrangement since usually the rotary table is engaged as each length of pipe or stand is removed from the string. Other actuating points could be used, if desired, such as the clutch lever that actuates the cathead that pulls on the pipe tongs to initially break the threaded connections between the length of pipe pulled from the hole and pipe string.

It is one of the other aspects of this invention, to provide means for indicating when the drilling mud in a well bore is above a given reference point. In the embodiment shown, hydrostatic head-sensing valve 380, FIGS. 1 and 11, is connected into coupling 361, which is welded into bell nipple 164a of wellhead 165. The valve includes plug 362 that is threaded into the coupling. The plug has been bored and triply counterbored to provide successively, from the inside, largest diameter threaded counterbore 363, smaller diameter, smooth counterbore 364, still smaller diameter smooth counterbore 366, and a short length, internally threaded bore 367. Diaphragm 368 is seated at the base of counterbore 364. Spacer cylinder 369 is located in the counterbore between diaphragms 368 and 370. Pressure ring 371 holds the two diaphragms and the spacer ring in the counterbore and in sealing engagement with each other. Pipe plug 372 in spacer 369 is removed through the opening provided in portion 373 of the plug, when the diaphragms are assembled, and the space between the diaphragms is filled with an inert, high-boiling-point liquid to act as a pressure transfer liquid. The space should be sufficiently filled with the liquid to maintain substantially parallel movement of the diaphragms. Washer 374, originally installed outwardly of the outer diaphragm 368, has spring 375 placed thereon. The spring acts on valve system 376, which has an externally threaded shank portion 376, and an inner end turned down to extend within spring 375 and to provide a shoulder to engage the spring. Locknut 378 holds shank 376 in position to exert the desired force in spring 375. Small diameter axial bore or passage 381 is provided through valve stem 376. Head portion 379 of the stem is counterbored and internally threaded at 382 to receive conventional tubing fitting 383, the fitting has bore 384 therethrough to establish communication between the interior of conventional small diameter tubing 385 and bore or passage 381 through the valve stem. Also, lateral passage 386 is provided through plug 362 to communicate with the interior of the plug and valve stem bore 381, as will hereinbelow explained.

Figure 12:
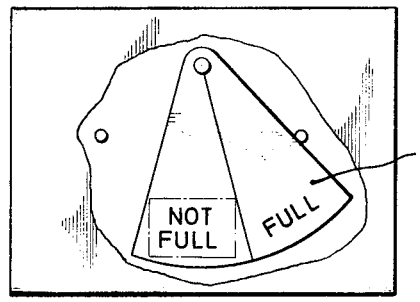
FIG. 12 is a front elevational view, taken along line 12—12 of FIG. 11.

Flag 390, FIGS. 11 and 12, comprises a segment of a circular disc affixed to the end of shaft 387. The shaft is supported by journal 388 mounted on panel 275 and held in place by locknut 389. Shaft 387 is connected to hub 391 to the rear of journal 388. Opposed arms 393a and 393b extend laterally from the hub, generally horizontally in opposite directions.

Hole 394 near the outer end of arm 393a receives one end of tension spring 395. The other end is attached to bolt 396, which extends from fitting 397 in the panel. The bolt is held by locknut 398. Arm 393b has the bifurcated upper end 399 of drive shaft 400 pivotally connected thereto. The lower portion of the shaft passes through oversize center bore 401 in upper portion 402a of diaphragm housing 402. Shaft 400 is connected at its lower end to diaphragm 405 that has its peripheral area bound between housing portions 402a and 402b. Upper part 402a of the housing is externally threaded to receive the bored outer end of angle bracket 403. Its inner end is connected to panel 275. The lower end of diaphragm housing portion 402b has an externally threaded hub 406 which has a central passage therethrough and which connects into the upper leg of 407. Conventional pipe fitting 408 is threaded into the left leg of T 407 to connect the aforesaid conventional small tubing 385 to valve 380, to communicate with the interior of T 407.

Figure 13:
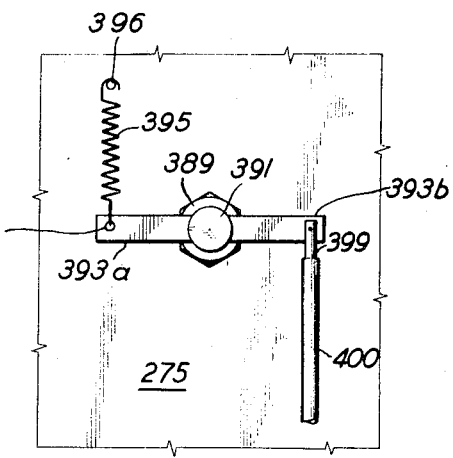
FIG. 13 is a rear elevational view, taken along line 13—13 of FIG. 11.

The other leg of T 407 is connected to choke assembly 410 and pressure regulator 411. If the drilling mud in bell nipple 164a exerts enough pressure on diaphragm 370 to hold resilient seat 374a on washer 374 against the end of valve stem with enough force to close passageway 381, the "FULL" section of flag 390 will be showing through the window in panel 275, for with no air escaping, the pressure below diaphragm 405 will be sufficient to overcome spring 395. If the mud level drops below the preselected level, however, spring 375 will open valve 380 and the pressure acting against diaphragm 405 will drop. Spring 395 will pull arm 393a clockwise (FIG. 13) and the "NOT FULL" section of flag 390 will appear in the window of the panel. Thus, the driller has another check on the condition of his hole besides the liquid level of the manometer and the pipe displacement indicator.

If desired, warning devices, such as horns and lights, can be arranged to be actuated by the movement of the flag to the "NOT FULL" position.

From the foregoing description of one embodiment of this invention by way of example it will be seen that this invention is one well adapted to attain all of the ends and objects hereinabove set forth, together with other advantages which are obvious and which are inherent to the apparatus and structure.

I claim:

1. Apparatus to allow the driller to compare the volume of mud removed from the mud tanks and pumped into the hole with the volume of pipe he has removed from the hole and determine if a sufficient volume of mud has been pumped into the hole to replace the volume of pipe removed, said apparatus comprising means providing a force proportional to the level of the mud in each tank, means for converting said forces to a turning moment that is proportional to the volume of mud in all of the tanks, means responsive to the turning moment for providing a fluid having a pressure proportional to the total volume of mud in the tanks, said means including a conduit having an inlet and an outlet, means connecting the inlet with a source of fluid under pressure, means in the inlet to the conduit for maintaining a constant volume of said pressure fluid flowing into said conduit, means for bleeding said fluid from the conduit at a rate proportional to the turning moment to cause the pressure in the conduit to be proportional to the total volume of mud in the tanks, means for providing a visual indication of the volume of drilling mud that has been pumped into the hole, said means including a first manometer having one leg connected to said conduit and the other to the bottom of a reservoir and a second manometer having one leg connected to the top of the reservoir and the other to the atmosphere, said first manometer being filled with a first liquid and the second being filled with a second liquid that has a specific gravity less than that of the first so that the second will be displaced from the reservoir as the first liquid is forced into the reservoir by an increase in conduit pressure, a scale positioned adjacent said second leg of the second manometer that is calibrated for the level of the liquid in the second leg to indicate changes in total volume of mud in the tanks in preselected units of volume, means for adjusting the height of the column of second fluid in the second leg of the second manometer to permit the fluid to be positioned at a reference point on said scale regardless of what volume of liquid is in the tanks, and means responsive to the removal of preselected lengths of pipe from the hole for indicating on said scale the total volume of pipe removed from the hole in the same volumetric units as shown by the liquid level in the second leg of the manometer.

2. The apparatus of claim 1 further provided with means for indicating when the drilling mud in the hole is above a certain level.

3. Apparatus for monitoring the drilling mud system of a drilling rig while the drill pipe is being pulled from the hole to indicate if formation fluid is entering the hole or drilling mud is being lost to the formation, said apparatus comprising means providing a signal proportional to the total volume of drilling mud in the mud tanks at the surface, means responsive to the drilling mud volume signal to indicate visually the total volume of drilling mud that has been pumped into the hole to replace drill pipe removed therefrom, and means for indicating visually the total volume of pipe that has been removed from the hole, said pipe and mud-volume-indicating means including scale means arranged to indicate the difference between the two volumes, whereby any intrusion of formation fluid or loss of drilling mud is apparent by the difference in the two volumes indicated on said scale means.

4. The apparatus of claim 3 in which the means providing a signal proportional to the total volume of drilling mud in the mud tanks includes means providing a force proportional to the level of the mud in each tank, means for converting said forces to a turning moment that is proportional to the volume of mud in all of the tanks, and means responsive to the turning moment for providing a fluid having a pressure proportional to the total volume of mud in the tanks.

5. The apparatus of claim 4 in which the means responsive to the turning moment includes a conduit having an inlet and an outlet, means connecting the inlet with a source of fluid under pressure, means in the conduit for maintaining a constant volume of said pressure fluid flowing into said conduit, means for bleeding said fluid from the conduit at a rate proportional to the turning moment to cause the pressure in the conduit to be proportional to the total volume of mud in the tanks.

6. The apparatus of claim 5 in which the means for providing a force proportional to the volume of drilling mud in each mud tank includes a float member for floating on the surface of the mud in the tank and for moving up and down with the level of the mud as the volume of mud in the tank changes, said float including a flexible walled container having a volume that changes with changes in its internal pressure, a reservoir mounted at a fixed elevation relative to the float member and a float conduit connected to the lower end of the reservoir and the float member, a piston-cylinder assembly with one side of the piston exposed to a constant pressure and the other side being exposed to the pressure adjacent the top of the reservoir, said reservoir and float conduit being partially filled with liquid to cause changes in the pressure in the top of the reservoir in proportion to the position of the mud level in the tank relative to the reservoir to cause the pressure differential across the piston to vary with changes in the level of the drilling mud in the container whereby the piston-cylinder assembly exerts a force that is proportional to the volume of mud in the tank.

7. The apparatus of claim 6 in which the means for converting the forces proportional to the mud level in each tank to a turning moment includes a balance arm mounted to pivot around a fixed axis, means connecting the piston-cylinder assembly associated with each tank to the balance arm on one side of the fixed axis so that the force exerted by each piston, in response to a lowering of the mud level, will urge the arm to pivot in one direction and a raising of the mud level will urge the arm to pivot in the other direction, each piston-cylinder assembly being connected to the balance arm at a distance from the axis that is proportional to the horizontal cross-sectional area of the tank with which it is associated, whereby the force exerted by the piston-cylinder assemblies on the arm at said distances from the fixed axis is proportional to the total volume of drilling mud in the mud tanks.

8. The apparatus of claim 7 in which each piston-cylinder assembly includes a piston comprising an upright tubular member having its upper end closed and an opening adjacent the lower end and a cylinder in which the piston extends that is partially filled with a liquid to a height above the opening in the lower end of the piston to form a sealed chamber between the liquid and the closed upper end of the piston, and means connecting the chamber with the reservoir adjacent its upper end to produce a differential pressure across the closed end of the piston proportional to variations in the mud level in the mud tank.

9. The apparatus of claim 8 in which the means for bleeding fluid from the conduit includes an orifice in the conduit and a valve member attached to the balance arm with one end positioned to vary the opening in the orifice in response to movement of the balance arm, means providing a constant force turning the balance arm to rotate around said axis in a direction opposite from that in which the pistons are urging it to rotate to counterbalance the turning moment they impose on the arm, said counterbalancing force plus the distance the force is located from the axis of the arm being substantially equal to the turning moment of the pistons when the mud levels in the tanks are at their lowest levels, and a cylinder having a piston connected to the balance arm with one side exposed to the pressure of the fluid in the conduit to exert a force thereon urging the arm to rotate in a direction opposite from the said constant force in proportion to the total volume of mud in the tanks to provide a force that increases as the forces imposed on the arm by the pistons decrease and to cause the rate of bleed of the fluid from the conduit through the orifice to produce a pressure in the orifice that increases as the total volume in the tanks increases with the pressure being proportional to the total volume of mud.

10. The apparatus of claim 5 in which the means providing a visual indication of the volume of drilling mud that has been pumped into the hole includes a reservoir, a first manometer having one leg connected to said conduit and the other to the bottom of said reservoir and a second manometer having one leg connected to the top of the reservoir and the other to the atmosphere, a first liquid partially filling the first manometer and reservoir, a second liquid having a specific gravity less than the first liquid filling the remainder of the reservoir and a portion of the second manometer so that the second will be displaced from the reservoir as the first liquid is forced in by an increase in conduit pressure, said second leg of the second manometer being calibrated to indicate changes in total volume in preselected units of volume.

11. The apparatus of claim 10 further provided with means for adjusting the height of the column of second fluid in the second leg of the second manometer to permit the fluid to be positioned at a reference point regardless of what volume of liquid is in the containers.

12. The apparatus of claim 3 further provided with means for indicating when the drilling mud in the hole is above a certain level.

13. Apparatus for monitoring the drilling mud system of a drilling rig while drill pipe is being pulled from the well bore to indicate any intrusion of formation fluid into the well bore or loss of drilling mud to the formation, comprising means providing a signal proportional to the volume of drilling mud in each mud pit, means integrating the volume signals for each mud pit to provide a signal proportional to the total volume of mud in the mud pits, and scale means responsive to the operation of pulling a length of pipe from the well bore and to the signal proportional to the total volume of mud in the mud pits for indicating the volume of drilling mud required to fill up the well bore after said length of pipe is pulled therefrom whereby the driller can determine if the volume of drilling mud he has pumped into the well bore is equal to the volume of pipe removed.

14. The apparatus of claim 13 scale means for indicating the volume of drilling mud required to fill up the hole comprises a scale graduated in volumetric units, a pointer movable along the scale, and means for moving the pointer a preselected distance along the scale for each preselected length of pipe pulled out of the well bore.

15. The apparatus of claim 14 in which the means for moving the pointer includes a wheel, means for rotating the wheel through a preselected angle for each preselected length of pipe pulled from the well bore, and means connecting the wheel to the pointer to cause the pointer to move a preselected distance for each movement of the wheel through the preselected angle.

16. The apparatus of claim 13 further provided with means for indicating when the drilling mud in the hole is above a certain level.

17. Apparatus for indicating the volume of pipe removed from a well bore comprising, a scale graduated in volumetric units, a pointer movable along the scale to indicate total volume of pipe removed, means for moving the pointer incremental distances along the scale for each preselected length of pipe removed, said means including ratchet means for moving the pointer said incremental distance each time said ratchet means is actuated and means for actuating the ratchet means each time said preselected length of pipe is removed from the well bore.

18. The apparatus of claim 17 in which the ratchet means includes a ratchet wheel, a pawl arranged to rotate the wheel through a preselected angle of rotation with each movement of the pawl, and means for so moving the pawl each time said preselected length of pipe is removed from the well bore.

19. The apparatus of claim 18 further provided with means for adjusting the angle through which the wheel is rotated with each movement of the pawl to change the incremental distance moved by the pointer as required to adjust the apparatus for pipe of different sizes or for changes in the length of pipe removed for each movement of the pawl.

20. Apparatus for monitoring changes in the total volume of drilling mud above ground comprising means providing a fluid pressure signal proportional to the total volume of such drilling mud and a dual density manometer comprising a first manometer containing a liquid with a specific gravity substantially greater than water and having a first leg exposed to the total volume pressure signal and a second leg connected to a reservoir having an internal cross-sectional area substantially greater than the internal cross-sectional area of the fluid passageways through the first and second legs so that there is a substantially greater change in the level of the liquid in the first leg due to changes in the pressure signal than there is in the liquid level of the liquid in the reservoir, a second manometer containing a liquid with a specific gravity substantially less than that of the first liquid and having a first leg connected to the reservoir and a second leg connected to the atmosphere, a scale adjacent the second leg of the second manometer calibrated in convenient volumetric units, said legs of the second manometer having a relatively small cross-sectional area through which the liquid therein may flow so that relatively small changes in the liquid level of the first manometer liquid in the reservoir will produce substantial changes in the height of the liquid level in the second leg of the second manometer, and a second reservoir connected to the first leg of the second manometer having a variable volume that can be changed to adjust the liquid level in the second leg of the second manometer to the desired starting point on the scale at the beginning of a monitoring operation.

21. The apparatus of claim 20 further provided with means for indicating the volume of pipe removed from the hole to permit such volume to be continually compared with the volume of mud pumped into the hole as indicated by the liquid level in the second leg of the second manometer.

22. The apparatus of claim 21 further provided with means for indicating when the drilling mud in the hole is above a certain level.

23. The apparatus of claim 20 in which the liquid in the first manometer is mercury.

* * * * *